No. 870,211. PATENTED NOV. 5, 1907.
E. ZAREMBA.
EVAPORATOR.
APPLICATION FILED MAR. 12, 1906.

Witnesses,
G. A. Paulerschmidt
Geog L Chindahl

Inventor
Edward Zaremba,
By Geo. E. Waldo,
Atty

UNITED STATES PATENT OFFICE.

EDWARD ZAREMBA, OF CHICAGO, ILLINOIS.

EVAPORATOR.

No. 870,211.  Specification of Letters Patent.  Patented Nov. 5, 1907.

Application filed March 12, 1906. Serial No. 305,474.

*To all whom it may concern:*

Be it known that I, EDWARD ZAREMBA, a citizen of the United States, and a resident of Chicago, Cook county, Illinois, have invented certain new and useful Improvements in Evaporators, of which the following is a specification.

This invention relates to evaporators, and relates particularly to evaporators especially designed and adapted for treating highly corrosive liquids.

The primary object of the invention is to eliminate the heating tubes and other metallic heating surfaces commonly used in evaporators for heating the liquid to be evaporated. To this end my invention consists of the various features, combinations of features and details of construction hereinafter described and claimed.

Figure 1:
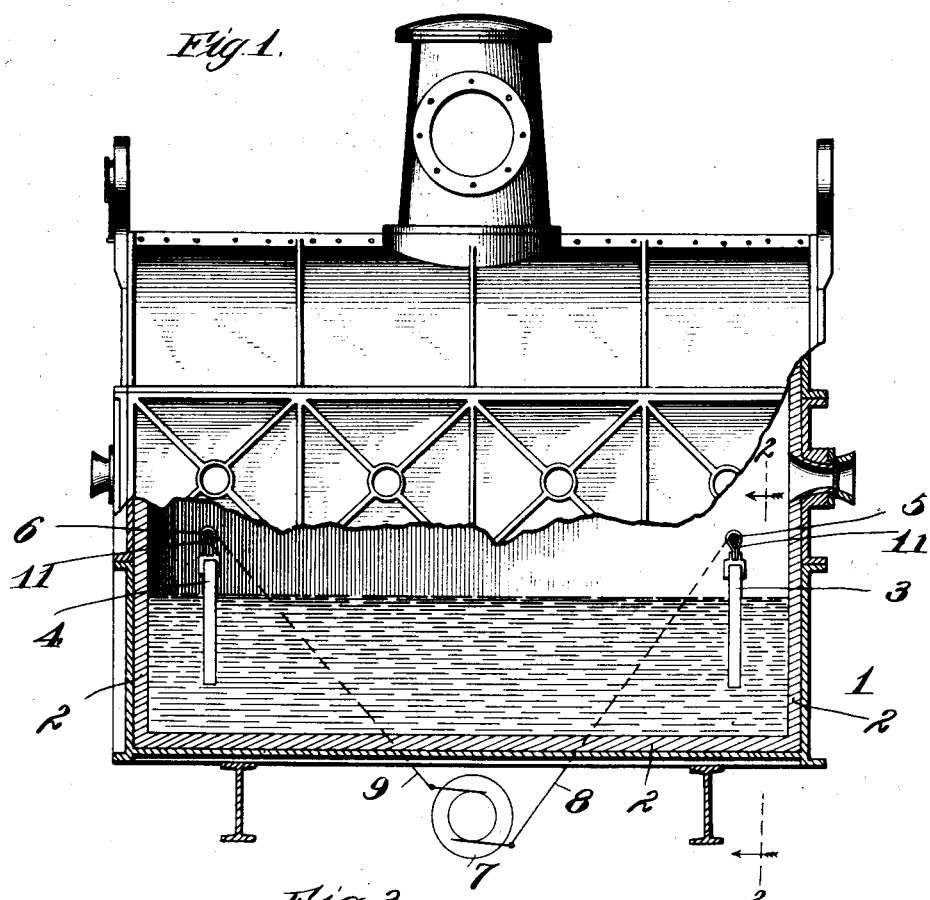
Figure 2:
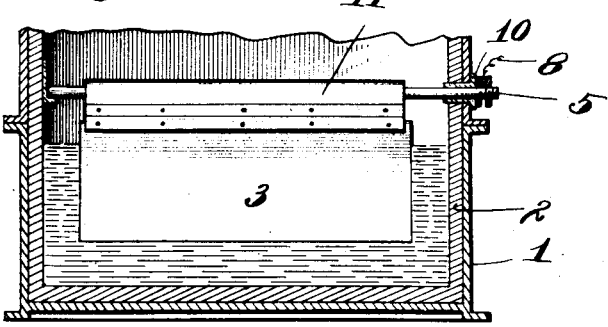

In the accompanying drawings, in which an evaporator of my invention is fully illustrated,—Figure 1 is a side view partly in section of an evaporator embodying my invention; and Fig. 2 is a sectional view thereof on the line 2—2 of Fig. 1.

Referring now to the drawings, 1 designates the shell or casing of the evaporator which is provided with a lining 2 of suitable refractory non-conducting material, as acid proof brick laid in acid proof cement, cement alone, or asphaltum composition.

Supported in the evaporator 1 are suitable electrodes 3 and 4, preferably made of some suitable non-corrodible conductor, as graphite or the like. As shown, said electrodes 3 and 4 consist of plates and are supported by rods 5 and 6 which extend in fixed position transversely across the evaporator adjacent to opposite ends thereof. The manner of supporting said electrodes may, however, be varied in any manner which suggests itself to persons skilled in the art, to meet varying requirements. The electrodes 3 and 4 are connected with the poles of any source of electrical energy located outside of the evaporator, as, for example, an electrical generator indicated at 7 by means of wires 8 and 9. In the case of open evaporating pans, said conductors 8 and 9 may extend over the upper edge thereof and be connected directly to the electrodes 3 and 4.

In the case of a vacuum pan, such as is shown in the drawings, the connection is made in the following manner:—The rods 5 and 6 are made of copper or other suitable electrical conductor and to provide for electrically connecting the connecting wires 8 and 9 thereto, an end of each of said rods 5 and 6 projects through a bushing 10 of suitable non-conducting material, as hard rubber, said rods being provided with suitable binding posts outside of said evaporator for connecting the conductors 8 and 9 thereto. As shown, also, the electrodes 3 and 4 are electrically connected with the rods 5 and 6 by means of straps or loops 11, made of sheet copper or other suitable conductor, the ends of which are secured to said electrodes, forming a loop through which the rods 5 and 6 extend.

In order to prevent the electrical connections within the evaporator from being destroyed or eaten by the corrosive fumes arising from the liquid in the evaporator, they may be covered or coated by means of any suitable non-corrodible substance, as enamel, asphaltum, or the like.

While I have herein shown my invention as embodied in the form of an evaporator known as a vacuum pan, it will be understood that the invention contemplates equally the use of any other well known form of evaporator whereby evaporation is carried on either at atmospheric pressure, in a partial vacuum or under pressure, the requisite changes necessary to adapt my invention for use in different kinds of evaporators being such as will readily suggest themselves to persons skilled in the art.

With the described construction, it is obvious that the liquid contents of the evaporator will form a resistance to the passage of the electrical current between the electrodes 3 and 4, which will operate, in a familiar manner, to heat the liquid in said evaporator to a degree corresponding to the tension of the current, the distance between said electrodes and the character of the contents of the evaporator. While in most cases a current of low voltage will preferably be used, the voltage will necessarily be varied to meet conditions, which, however, can be readily met by persons skilled in the electrical art.

In most cases, where the development of heat alone is the object desired, an alternating current will be used, but my invention contemplates equally the use of a direct current in case the electrolytic action upon the contents of the evaporator is desired in addition to heating the same.

I claim:—

1. An apparatus for evaporating corrosive liquors comprising a suitable receptacle, a non-conducting, refractory lining therefor, non-corrodible electrodes which extend below the designed liquid level and electrical conductors connected to said electrodes and supported entirely above the liquor level.

2. In an evaporator, the combination of a suitable closed receptacle, a refractory lining therefor, electrodes, means for supporting said electrodes comprising rods which are conductors of electricity and which extend across said receptacle and electrical conductors which connect said electrodes with said rods, said rods projecting through the wall of said receptacle at one side, a source of electrical energy and electrical conductors which connect said electrode supporting rods with the poles of said source of electrical energy.

In testimony that I claim the foregoing as my invention, I affix my signature in presence of two subscribing witnesses, this 10th day of March, A. D. 1906.

EDW. ZAREMBA.

Witnesses:
K. A. COSTELLO,
M. V. McGRATH.